US007403672B2

(12) United States Patent
Zhou et al.

(10) Patent No.: US 7,403,672 B2
(45) Date of Patent: Jul. 22, 2008

(54) INTEGRATED LINEAR POLARIZER

(75) Inventors: Dashun Steve Zhou, San Jose, CA (US); Michael G. Lee, San Jose, CA (US); Alexei L. Glebov, San Mateo, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/611,255

(22) Filed: Dec. 15, 2006

(65) Prior Publication Data

US 2008/0144161 A1 Jun. 19, 2008

(51) Int. Cl.
*G02B 6/00* (2006.01)
*G02B 6/02* (2006.01)

(52) U.S. Cl. .............................. 385/11; 385/8; 385/123; 385/140; 385/143

(58) Field of Classification Search ........................ None
See application file for complete search history.

(56) References Cited

U.S. PATENT DOCUMENTS 6,845,201 B2* 1/2005 Kim et al. ................... 385/123
6,917,748 B2* 7/2005 Glebov et al. ............... 385/140
6,937,881 B2* 8/2005 Konig ...................... 455/575.1
7,224,881 B2* 5/2007 Aoki et al. .................. 385/140
2006/0106262 A1* 5/2006 McGinniss et al. .......... 570/113

* cited by examiner

*Primary Examiner*—Tina M Wong
(74) *Attorney, Agent, or Firm*—Baker Botts L.L.P.

(57) ABSTRACT

A method for creating an integrated linear polarizer is provided. An electro-optical component is fabricated and may include a bottom electrode, a bottom cladding layer, side cladding features, an electro-optic polymer layer, a top cladding layer, and a top electrode. After fabrication, the electro-optical component is poled to create or enhance polarization properties of the electro-optic polymer layer. The electro-optical component may be heated to at least a first threshold temperature. An electric field may then be applied to the electro-optical component. In the presence of the electric field, the electro-optical component may be cooled to at or below a second threshold temperature that is less than the first threshold temperature. Once the electro-optical component has cooled to the second threshold temperature, the electric field may be removed.

20 Claims, 2 Drawing Sheets

INTEGRATED LINEAR POLARIZER

TECHNICAL FIELD OF THE INVENTION

The present invention relates generally to optoelectronics and, more particularly, to an integrated linear polarizer.

BACKGROUND OF THE INVENTION

Integrated optical components and modules have been the subject of intensive research and development in recent years. Optical interconnects have been used to create high speed data links. Linear polarizers sometimes need to be employed in photonics circuits because particular components have certain requirements including polarization sensitivity.

SUMMARY

In accordance with the present invention, techniques for fabricating and poling an integrated linear polarizer are provided. According to particular embodiments, these techniques describe an integrated linear polarizer fabricated using electro-optic materials.

According to a particular embodiment, a method for creating an integrated linear polarizer comprises fabricating an electro-optical component. The electro-optical component includes a bottom electrode, a bottom cladding layer, side cladding features, an electro-optic polymer layer, a top cladding layer, and a top electrode. The bottom electrode is separated from the electro-optic polymer layer by the bottom cladding layer, and the top electrode is separated from the electro-optic polymer layer by the top cladding layer. The method further comprises heating the electro-optical component to greater than or equal to a first temperature and applying an electric field to the electro-optical component. The electric field is created by a voltage differential between the top electrode and the bottom electrode. The method further comprises cooling the electro-optical component, where the electric field is maintained during the cooling of the electro-optical component. The method finally comprises removing the electric field when the electro-optical component reaches a temperature less than or equal to a second temperature, where the second temperature less than the first temperature.

Embodiments of the invention provide various technical advantages. For example, with these techniques, integrated linear polarizers may be fabricated in micron scale using standard integrated circuit fabrication techniques. In some embodiments, the integrated linear polarizers produced by these techniques may provide a low cost solution because the polymers used may be less expensive than materials used by traditional methods. Also, in particular embodiments, these techniques may integrate linear polarizers with other optical components, such as modulators and switches. The optoelectronic devices may be created with the same fabrication process and using the same electro-optic materials. In certain embodiments, these techniques may provide linear polarizers that are passive and do not require external power or control.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
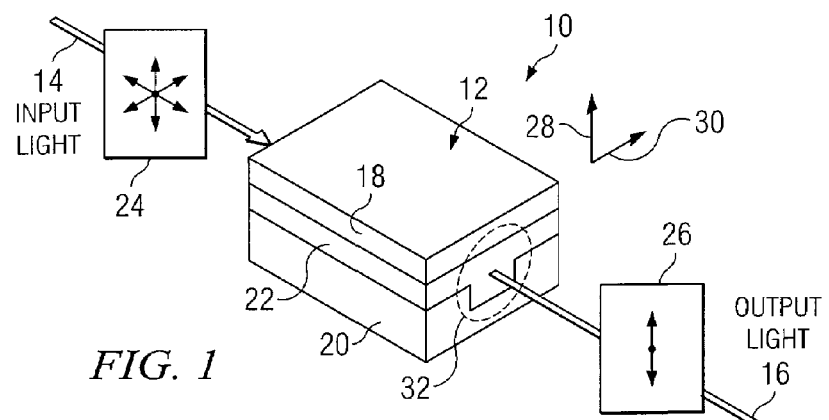
FIG. 1 illustrates a system in which an integrated linear polarizer can be employed to polarize light.

FIG. 1 illustrates a system, indicated generally at 10, in which an integrated linear polarizer 12 can be employed to polarize light. As illustrated, system 10 includes integrated linear polarizer 12, input light 14, and output light 16. In general, elements within system 10 demonstrate the functionality of an integrated linear polarizer.

In the illustrated embodiment, integrated linear polarizer 12 includes a top clad 18, a bottom clad 20, and an electro-optic layer 22. In general, top clad 18 and bottom clad 20 surround and assist in the functionality of electro-optic layer 22. Top clad 18 and bottom clad 20 may be formed of any suitable materials, such as a polymer material. The polymer material may be, for example, UV15, which is a commercially available epoxy made by MASTER BOND, INC. that can be cured by ultraviolet light. In some embodiments, top clad 18 and bottom clad 20 comprise a uniform material that is selected for its optical and/or electrical properties. In particular embodiments, top clad 18 and bottom clad 20 may be made from different materials. The material forming top clad 18 and bottom clad 20 may have a particular refractive index.

Electro-optic layer 22 is generally used to guide and polarize light passing through integrated linear polarizer 12. In the illustrated embodiment, electro-optic layer 22 includes a waveguide, indicated generally at 32, having an inverted ridge waveguide structure. In other embodiments, electro-optic layer 22 has any appropriate form, shape, or structure for guiding light.

Electro-optic layer 22 may be formed of a material with electro-optic properties. In particular embodiments, electro-optic layer 22 is formed from an electro-optic polymer, which is a class of polymers displaying second-order nonlinear optical properties. In particular embodiments, the electro-optic polymer is composed of two substances: chromophore and host. The chromophore may be comprised of molecules whose molecular structure lacks inversion symmetry, meaning that each molecule has a net dipole moment. Bulk material may not have an overall dipole moment due to the random orientation of molecules. The chromophore may contribute to the nonlinear electro-optic behavior of the electro-optic polymer. The host may provide the structure in which the chromophores reside. Chromophore-host combinations may include: CLD1-amorphous polycarbonate, CLD1-polymethylmethacrylate, and DH6-amorphous polycarbonate. These materials can be used to fabricate optoelectronic modulators and switches.

In certain embodiments, the electro-optic polymer in electro-optic layer 22 is poled. The process of poling the electro-optic polymer may create or supplement the light polarizing properties of electro-optic layer 22. In particular embodiments, the electro-optic polymer is poled by aligning the net dipole moments of the chromophore molecules. In some embodiments, the temperature of the polymer is first increased to at least a first threshold temperature. Increasing the temperature may increase the ability for the chromophore molecules to rotate within the host material. An electric field is applied, and the temperature of the polymer is decreased while in the presence of the electric field. Applying the electric field may align the dipole moments of the chromophore molecules. Once the temperature of the polymer has reached at or below a second threshold temperature, the electric field may be removed, as the alignment of the chromophore molecules may be "frozen" in the host material. The poling process may be carried out in air or in other gases, such as nitrogen. In certain embodiments, freezing the alignment of the chromophore molecules when the dipole moments of the molecules are substantially aligned causes the electro-optic polymer in electro-optic layer 22 to linearly polarize light passing through the electro-optic polymer. In certain embodiments, an increase in temperature is not required to pole the electro-optic polymer. In particular embodiments, integrated linear polarizer 12 also includes a top electrode and a bottom electrode (not illustrated). The top electrode and the bottom electrode may be used to create the electric field. In some embodiments, the top electrode may be placed above the top clad while the bottom electrode is placed below the bottom clad. In other embodiments, the top electrode and the bottom electrode are placed in other suitable locations.

While integrated linear polarizer 12 is depicted as a single component containing a particular configuration and arrangement of elements, it should be noted that this is only an example, and the components and functionality of integrated linear polarizer 12 may be modified, reorganized, or redistributed as appropriate.

Input light 14 is, generally, a light wave or light waves entering integrated linear polarizer 12. A light wave is an electromagnetic wave which has an electrical field perpendicular to its direction of propagation. Unpolarized light has an electric field in multiple directions, while polarized light has an electrical field almost entirely in only one direction. In particular embodiments, input light 14 is unpolarized light having an electric field in all possible directions, as illustrated in box 24. In some embodiments, input light 14 is unpolarized light having an electric field in two or more directions. Input light 14 may also be polarized light. Output light 16 is, generally, a light wave or light waves exiting integrated linear polarizer 12. In particular embodiments, output light 16 is polarized light having an electric field in only one direction, as illustrated in box 26. In operation, input light 14 passes through integrated linear polarizer 12 and is polarized, resulting in output light 16.

In the illustrated embodiment, system 10 also includes two directional vectors: vertical arrow 28 and horizontal arrow 30. Vertical arrow 28 indicates the vertical component of the polarization of a light wave, while horizontal arrow 30 indicates the horizontal component of the polarization of the light wave. In particular embodiments, integrated linear polarizer 12 is a vertical linear polarizer, which means that it reduces or eliminates the horizontal component of the polarization of a light wave. It is to be understood that, rather than indicating any physical configuration, the terms "vertical" and "horizontal" are used to merely indicate relative direction.

TABLE 1

|  | Vertical component | Horizontal component | Extinction ratio |
| --- | --- | --- | --- |
| Unpoled waveguide | 25.1 µW | 9.4 µW | 4.2 dB |
| Poled waveguide | 16.1 µW | $7.4 * 10^{-3}$ µW | 33.4 dB |

To illustrate, TABLE 1 shows sample measurements of the power of output light 16 after passing through an unpoled waveguide (e.g. electro-optic layer 22 before poling) and a poled waveguide (e.g. electro-optic layer 22 after poling). In the poled waveguide, a section of twenty millimeters of waveguide was electrically poled. The power of input light 14 was the same in each instance. For the unpoled waveguide, the extinction ratio between the vertical component (vertical linear polarization) and the horizontal component (horizontal linear polarization) is merely 4.2 dB, indicating a slight birefringent behavior. On the other hand, for the poled waveguide, the extinction ratio is 33.4 dB, which means that the poled waveguide blocked the passage of a substantial amount of the horizontally polarized light. This is a characteristic of a vertical linear polarizer.

Particular embodiments of a system for polarizing light have been described and are not intended to be all inclusive. While system 10 is depicted as containing a certain configuration and arrangement of elements, it should be noted that this is only an example, and the components and functionality of system 10 may be adapted, modified, reorganized, or redistributed as appropriate. In some embodiments, integrated linear polarizer 12 is integrated into a larger optoelectronic device or system.

Figure 2:
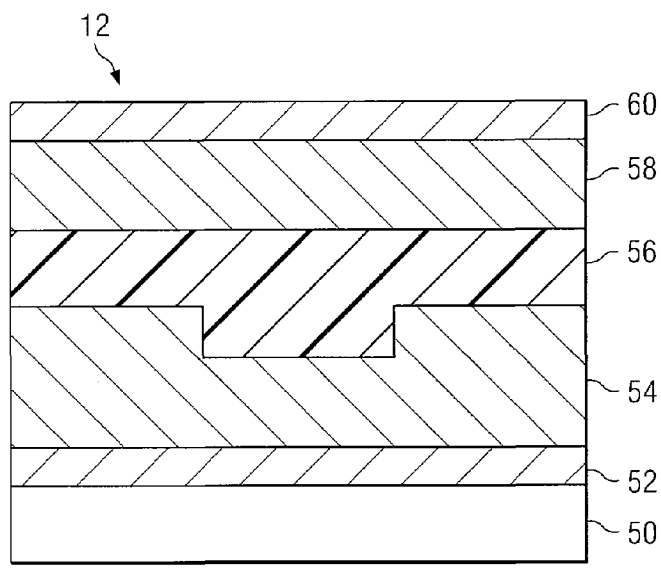
FIG. 2 illustrates a side-view of an integrated linear polarizer, showing layers deposited on a substrate.

FIG. 2 illustrates a side-view of an integrated linear polarizer 12, showing layers deposited on a substrate 50. As illustrated, integrated linear polarizer 12 includes a substrate 50, a bottom electrode 52, a bottom/side clad 54, an electro-optic layer 56, a top clad 58, and a top electrode 60. In particular embodiments, the elements within integrated linear polarizer 12 are formed using traditional semiconductor fabrication techniques. In other embodiments, integrated linear polarizer 12 is formed using other suitable techniques. In general, the elements within integrated linear polarizer 12 function to polarize light waves.

In the illustrated embodiment, substrate 50 is the foundation for integrated linear polarizer 12. In particular embodiments, substrate 50 may be a silicon substrate. In certain embodiments, substrate 50 is a substrate shared by multiple integrated devices, such as integrated linear polarizer 12, other optoelectronic devices, and electronic devices. Substrate 50 may be formed using traditional semiconductor device fabrication techniques.

Bottom electrode 52 may be formed of a conducting material deposited on substrate 50 and then properly patterned using standard semiconductor techniques. In particular embodiments, conducting metal, e.g., gold, is deposited on substrate 50 using any suitable semiconductor deposition technique in order to form bottom electrode 52. In certain embodiments, bottom electrode 52 and top electrode 60 are able to create an electric field to align the dipoles of the chromophores during the poling process. In particular embodiments, after fabrication, bottom electrode 52 and top electrode 60 are used to modify the electro-optic characteristics of electro-optic layer 56.

Bottom/side clad 54 is used with the top clad 58 to surround and assist in the functionality of electro-optic layer 56. In particular embodiments, bottom/side clad 54 is formed from a polymer material, such as UV15. In other embodiments, bottom/side clad 54 is formed from another suitable material. In certain embodiments, bottom/side clad 54 is formed by spin-coating the bottom clad on top of the bottom electrode, and then properly curing the bottom clad. Photoresist may then be coated on the bottom clad, and the side clads may then be patterned by lithography. The photoresist serves as the etch mask for etching the bottom clad to make the bottom/side clad 54. For example, oxygen plasma etching may be used. Photoresist may then be stripped after the etch.

In the illustrated embodiment, electro-optic layer 56 is formed from material with electro-optic properties and contains an inverted ridge waveguide structure, such as inverted ridge waveguide 32. In some embodiments, the waveguide shown in electro-optic layer 56 may be electro-optic layer 22. In certain embodiments, the material forming electro-optic layer 56 is composed of two substances: chromophore and host. The chromophore may be comprised of molecules whose molecular structure lacks inversion symmetry, meaning that each molecule has a net dipole moment. The host may provide the structure in which the chromophores reside. In certain embodiments, these chromophore-host combinations may include: CLD1-amorphous polycarbonate, CLD1-polymethylmethacrylate, and DH6-amorphous polycarbonate. In other embodiments electro-optic layer 56 is composed of another suitable material(s). In particular embodiments, electro-optic layer 56 is formed by spin coating electro-optic material on bottom/side clad 54 and then curing the electro-optic material. Generally, electro-optic layer 56 may be formed using any traditional semiconductor fabrication or other suitable techniques. In certain embodiments, after integrated linear polarizer 12 is fabricated, electro-optic layer 56 is poled in order to create or supplement the polarization properties of electro-optic layer 56.

Top clad 58 may be used with bottom/side clad 54 to contain and house electro-optic layer 56. In particular embodiments, top clad 58 is formed from a polymer material, such as UV15. In other embodiments, top clad 58 is formed from another suitable material. In certain embodiments, top clad 58 is formed by spin-coating on top of electro-optic layer 56, and then properly curing top clad 58. In some embodiments, top clad 58 is constructed from the same material and in the same manner as bottom/side clad 54. Top electrode 60 may be formed of a conducting material deposited on top clad 58 and then properly patterned using standard semiconductor techniques. In some embodiments, conducting metal, e.g. gold, is deposited on top clad 58 using any suitable semiconductor deposition technique in order to form top electrode 60. In particular embodiments, top electrode 60 is formed using the same material as bottom electrode 52.

Particular embodiments of an integrated linear polarizer have been described and are not intended to be all inclusive. While integrated linear polarizer 12 is depicted as containing a certain configuration and arrangement of elements, it should be noted that this is only an example, and the components and functionality of integrated linear polarizer 12 may be adapted, modified, reorganized, or redistributed as appropriate. In particular embodiments, integrated linear polarizer 12 is an integrated component of an optoelectronic device comprising a plurality of electro-optic elements.

Figure 3:
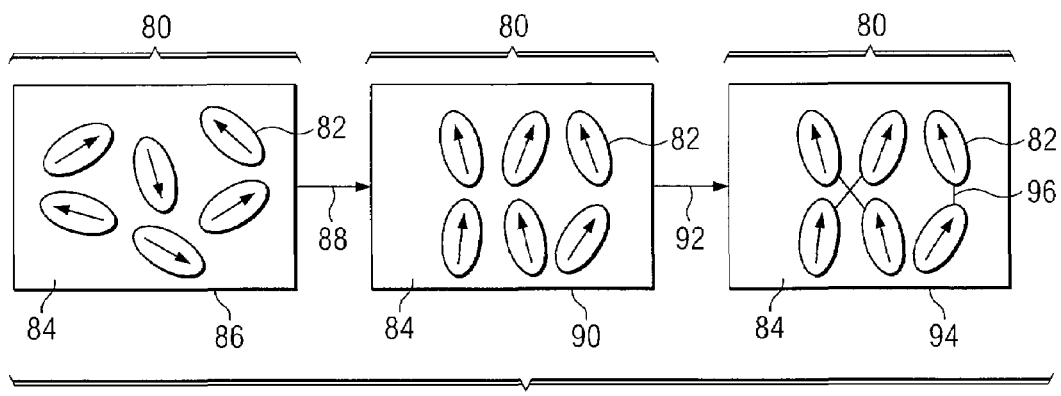
FIG. 3 illustrates the effects of changing the electrical field and temperature of an electro-optic polymer.

FIG. 3 illustrates the effects of changing the electrical field and temperature of an electro-optic polymer, indicated generally at 80. In the illustrated embodiment, electro-optic polymer 80 includes chromophores 82 and host 84. Host 84 may provide the structure in which chromophores 82 are suspended. In certain embodiments, chromophore-host combinations include: CLD1-amorphous polycarbonate, CLD1-polymethylmethacrylate, and DH6-amorphous polycarbonate. These materials can be used to fabricate optoelectronic modulators and switches. In other embodiments, different combinations of substances or a single substance can be used to form electro-optic polymer 80.

Chromophore 82 may be comprised of molecules whose molecular structure lacks inversion symmetry, meaning that each molecule has a net dipole moment. When chromophore 82 comprises multiple molecules, no overall dipole moment may exist because the molecules may be randomly oriented, as shown in box 86. The chromophore may contribute to the nonlinear electro-optic behavior of the electro-optic polymer. In the illustrated embodiment, each chromophore 82 molecule includes an arrow which indicates the dipole moment of that molecule. As shown by these arrows, chromophores 82 in box 86 have net dipole moments in random and differing directions.

In the illustrated embodiment, box 86 represents electro-optic polymer 80 before transformation 88, while box 90 represents electro-optic polymer 80 after transformation 88. In particular embodiments, an electric field is applied to electro-optic polymer 80 during transformation 88. The electric field may cause the dipole moments of chromophores 82 to align according to the direction of the electric field. As illustrated, chromophores 82 may not align exactly parallel to the electric field direction. This may be caused by a difficulty for the individual molecules of chromophore 82 to rotate within host 84.

In some embodiments, the temperature of electro-optic polymer 80 is increased, which may allow the individual molecules of chromophore 82 to rotate more freely so that their dipole moments are more nearly parallel. In particular embodiments, electro-optic polymer 80 is increased to a threshold temperature. This threshold temperature may be dictated by the material comprising electro-optic polymer 80. In some embodiments, the threshold temperature is a temperature sufficient to soften, but not melt, electro-optic polymer 80. In other embodiments, the threshold temperature is a temperature sufficient to melt electro-optic polymer 80. The threshold temperature may be set to any suitable value. In certain embodiments, electro-optic polymer 80 is increased to a temperature at or above 145 degrees Celsius. In other embodiments, electro-optic polymer 80 is heated to other temperatures suitable to allow electro-optic polymer 80 to be poled. In some embodiments, no temperature increase is required to pole electro-optic polymer 80.

In particular embodiments, the electric field in electro-optic polymer 80 is increased, which may encourage the individual molecules of chromophore 82 to rotate more freely so that their dipole moments are more nearly parallel. In some embodiments, the electric field is provided by creating a voltage difference between bottom electrode 52 and top electrode 60. In certain embodiments, the electric field is increased to 100 Volts per micrometer or greater. In other embodiments, different electric field strengths are used in order to pole electro-optic polymer 80. The electric field strength may be dictated by the material comprising electro-optic polymer 80. In some embodiments, the electric field strength may be dependent upon the threshold temperature used above. The electric field strength may be set to any suitable value.

Once the dipole moments of the chromophores 82 are aligned, the alignment may be "frozen" by reducing the temperature of the electro-optic polymer 80. In the illustrated embodiment, transformation 92 represents cooling of the electro-optic polymer 80. In particular embodiments, the electric field is maintained while the temperature of electro-optic polymer 80 is reduced. In some embodiments, the electric field is maintained at the same intensity throughout the cooling process, while, in other embodiments, the strength of the electric field is changed during the cooling process. Once the temperature of electro-optic polymer 80 is at or below a second threshold level, the electric field may be removed or reduced. This second threshold temperature may be dictated by the material comprising electro-optic polymer 80. In some embodiments, the second threshold temperature may be a temperature at which movement of chromophores 82 within electro-optic polymer 80 is limited. The second threshold temperature may be set to any suitable value. In some embodiments, the poling process may be carried out in air or in other gases, such as nitrogen.

As illustrated in box 94, the direction of the net dipole moments of the molecules comprising the chromophore 82 are substantially aligned. In box 94, the black lines 96 indicate bonding between different molecules within the chromophore 82. Also, as illustrated in box 94, the net dipole moments of the molecules in chromophore 82 may not be exactly parallel. In some embodiments, the net dipole moments may not change direction after the electric field is removed, while in other embodiments, the net dipole moments may slightly change direction after removal of the electric field. Whether or not the dipole moments change direction may be based on factors such as: the material comprising host 84, the temperature of electro-optic polymer 80, the electric field strength previously applied to electro-optic polymer 80, and other factors.

Particular embodiments of an electro-optic polymer have been described and are not intended to be all inclusive. While electro-optic polymer 80 is depicted as containing a certain configuration and arrangement of elements, it should be noted that this is only an example, and the components and functionality of electro-optic polymer 80 may be combined, separated, adapted, modified, reorganized, and redistributed as appropriate. Also, the functionality of electro-optic polymer 80 may be provided by any suitable collection and arrangement of components. For example, electro-optic polymer 80 may be a homogeneous substance comprising only material with properties similar to those of chromophores 82.

Figure 4:
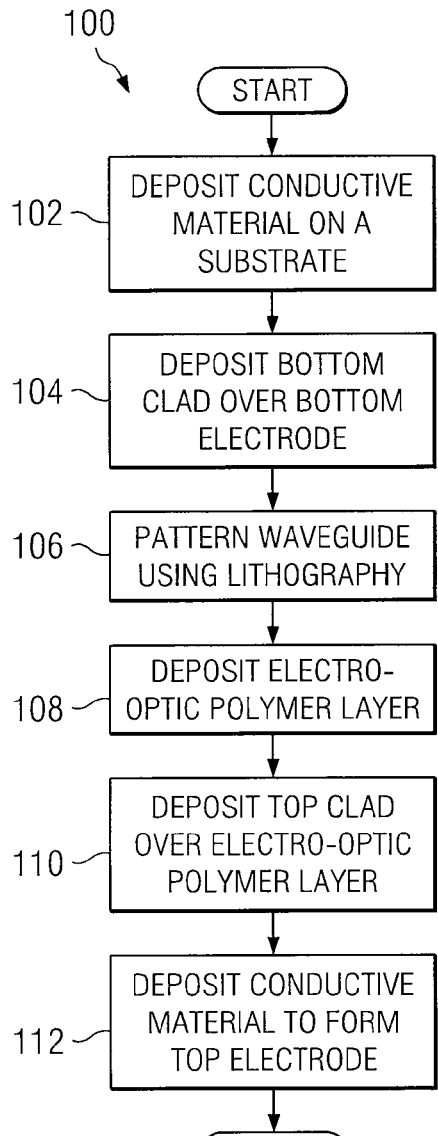
FIG. 4 is a flowchart illustrating a method of fabricating an integrated linear polarizer.

FIG. 4 is a flowchart illustrating a method, indicated generally at 100, of fabricating integrated linear polarizer 12. In particular embodiments, method 100 fabricates layers for integrated linear polarizer 12, as shown in FIG. 2. At step 102, a fabrication device deposits conductive material on a substrate. The conductive material may then be properly patterned. In some embodiments, the conductive material is a conductive metal, such as gold. In certain embodiments, the conductive material is deposited and/or patterned according to standard semiconductor fabrication techniques. In particular embodiments, the conductive material forms bottom electrode 52 on top of substrate 50.

At step 104, the fabrication device deposits the bottom clad over the bottom electrode created in step 102. In particular embodiments, the fabrication device deposits the bottom clad by spin-coating a material on top of the bottom electrode and then properly curing that material. In certain embodiments, the bottom clad is formed of a polymer material, such as UV15. The fabrication device then patterns a waveguide using lithographic techniques in step 106. In particular embodiments, the fabrication device coats photoresist on the bottom clad and uses the photoresist to pattern the bottom clad with lithography. The photoresist may serve as the etch mask for etching the bottom clad, which can be done by using oxygen plasma etching. In certain embodiments, the photo-resist is stripped after the etching is completed. In particular embodiments, the patterned bottom clad forms bottom/side clad 54.

The electro-optic polymer is deposited in step 108. In some embodiments, the fabrication device deposits the electro-optic polymer by spin-coating and curing the electro-optic material on the bottom clad. In particular embodiments, the electo-optic polymer is deposited to form a waveguide structure. The electro-optic polymer may form electro-optic layer 56.

At step 110, the fabrication device deposits the top clad over the electro-optic polymer layer. In particular embodiments, step 110 is substantially similar to step 104. In certain embodiments, the top clad is formed of the same material as the bottom clad, while, in other embodiments, the composition of the top clad and the bottom clad differ. The top clad may be top clad 58. Finally, at step 112, the fabrication device deposits conductive material in order to form top electrode. The conductive material may then be properly patterned. In particular embodiments, step 112 is substantially similar to step 102. In certain embodiments, the top electrode is formed of the same material as the bottom electrode, while, in other embodiments, the composition of the top electrode and the bottom electrode differ. The top electrode may be top electrode 60.

The method described with respect to FIG. 4 is merely illustrative, and it is understood that the manner of operation and devices indicated as performing the operations may be modified in any appropriate manner. While the method describes particular steps performed in a specific order, it should be understood that integrated linear polarizer 12 contemplates any suitable collection and arrangement of elements performing some, all, or none of these steps in any operable order.

Figure 5:
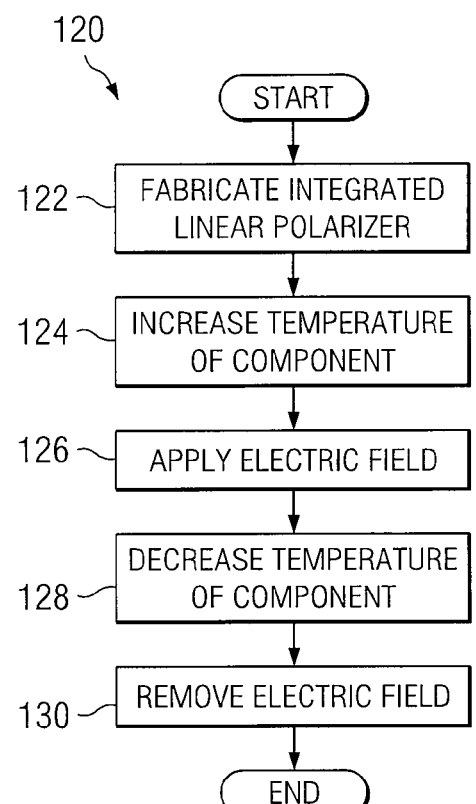
FIG. 5 is a flowchart illustrating a method of poling an integrated linear polarizer.

FIG. 5 is a flowchart illustrating a method, indicated generally at 120, of poling an integrated linear polarizer. At step 122, integrated linear polarizer 12 is fabricated. In some embodiments, integrated linear polarizer 12 is fabricated using method 100, described above with regards to FIG. 4.

At step 124, the temperature of integrated linear polarizer 12 is increased. An electric field is applied in step 126. In particular embodiments, step 124 and step 126 occur simultaneously, while in other embodiments either step 124 or step 126 may occur first followed by the other. In certain embodiments, the temperature of integrated linear polarizer 12 is increased to a temperature at or above 145 degrees Celsius. It is to be understood that any appropriate temperature may be used to pole integrated linear polarizer 12, and any temperature increase or decrease may be caused by any suitable device or method. In some embodiments, the electric field meets or exceeds 100 Volts per micrometer. In certain embodiments, the electric field is generated by a voltage difference between bottom electrode 52 and top electrode 60. It is to be understood that any appropriate electric field strength may be used to pole integrated linear polarizer.

At step 128, the temperature of integrated linear polarizer 12 is decreased. In particular embodiments, the electric field is maintained while the temperature of integrated linear polarizer 12 is decreased. In certain embodiments, the electric field strength is held constant while the temperature of integrated linear polarizer 12 is decreased. In other embodiments, the electric field strength varies while the temperature of integrated linear polarizer 12 is decreased. At step 130, the electric field is removed once the temperature is at or below a threshold temperature. In some embodiments, step 128 continues after step 130 is completed. In other embodiments, steps 128 and 130 are completed in any appropriate order to pole integrated linear polarizer 12.

The method described with respect to FIG. 5 is merely illustrative, and it is understood that the manner of operation and devices indicated as performing the operations may be modified in any appropriate manner. While the method describes particular steps performed in a specific order, it should be understood that integrated linear polarizer 12 contemplates any suitable collection and arrangement of elements performing some, all, or none of these steps in any operable order. In particular embodiments, a temperature increase and/or a temperature decrease are not required to pole integrated linear polarizer 12. In certain embodiments, the poling process may be carried out in air or in other gases, such as nitrogen. In some embodiments, integrated linear polarizer 12 is poled using methods other than applying an electric field.

Although the present invention has been described in several embodiments, a myriad of changes and modifications may be suggested to one skilled in the art, and it is intended that the present invention encompass such changes and modifications as fall within the present appended claims.

What is claimed is:

1. A method for creating an integrated linear polarizer comprising:
   fabricating an electro-optical component comprising a bottom electrode, a bottom cladding layer, side cladding features, an electro-optic polymer layer, a top cladding layer, and a top electrode, the bottom electrode separated from the electro-optic polymer layer by the bottom cladding layer and the top electrode separated from the electro-optic polymer layer by the top cladding layer;
   heating the electro-optical component to greater than or equal to a first temperature;
   applying an electric field to the electro-optical component, the electric field created by a voltage differential between the top electrode and the bottom electrode;
   cooling the electro-optical component, wherein the electric field is maintained during the cooling; and
   removing the electric field when the electro-optical component reaches a temperature less than or equal to a second temperature, the second temperature less than the first temperature.

2. The method of claim 1, wherein the electro-optic polymer layer polarizes a light signal passing through the electro-optic polymer layer.

3. The method of claim 1, wherein the electro-optic polymer layer comprises chromophores and a host, each chromophore having a dipole moment.

4. The method of claim 3, wherein, in the presence of the electric field, the net dipole moment of each chromophore substantially aligns with the electric field.

5. The method of claim 3, wherein the net dipole moment of each chromophore is substantially parallel to the net dipole moment of other chromophores after removing the electric field.

6. The method of claim 3, wherein a combination of the chromophores and the host comprises one of the following combinations: CLD1-amorphous polycarbonate, CLD1-polymethylmethacrylate, and DH6-amorphous polycarbonate.

7. The method of claim 1, wherein the electro-optical component is an integrated component of an optoelectronic device formed during the fabrication step and comprising a plurality of electro-optic elements.

8. The method of claim 1, further comprising altering an intensity of the electric field during the cooling of the electro-optical component.

9. An integrated linear polarizer comprising:
   a bottom electrode;
   a top electrode;
   an electro-optic layer separated from the bottom electrode by a bottom cladding layer and separated from the top electrode by a top cladding layer, the electro-optic layer comprising a polarized electro-optic polymer, wherein the electro-optic polymer was polarized by a polarization process, the polarization process comprising: applying an electric field to the electro-optic polymer while a temperature of the electro-optic polymer is at or above a first temperature, reducing the temperature of the electro-optic polymer in the presence of the electric field, and removing the electric field when the temperature is less than or equal to a second temperature, the second temperature less than the first temperature.

10. The integrated linear polarizer of claim 9, wherein the electro-optic polymer polarizes a light signal passing through the electro-optic layer.

11. The integrated linear polarizer of claim 9, wherein the electro-optic polymer comprises chromophores and a host, each chromophore having a dipole moment.

12. The integrated linear polarizer of claim 11, wherein, in the presence of the electric field, the net dipole moment of each chromophore substantially aligns with the electric field.

13. The integrated linear polarizer of claim 11, wherein the net dipole moment of each chromophore is substantially parallel to the net dipole moment of other chromophores after removing the electric field.

14. The integrated linear polarizer of claim 11, wherein a combination of the chromophores and the host comprises one of the following combinations: CLD1-amorphous polycarbonate, CLD1-polymethylmethacrylate, and DH6-amorphous polycarbonate.

15. The integrated linear polarizer of claim 9, wherein the integrated linear polarizer is an integrated component of an optoelectronic device comprising a plurality of electro-optic elements.

16. The integrated linear polarizer of claim 9, wherein the polarization process further comprises altering an intensity of the electric field while reducing the temperature of the electro-optic polymer in the presence of the electric field.

17. A device for creating an integrated linear polarizer comprising:
   means for fabricating an electro-optical component comprising a bottom electrode, a bottom cladding layer, side cladding features, an electro-optic polymer layer, a top cladding layer, and a top electrode, the bottom electrode separated from the electro-optic polymer layer by the bottom cladding layer and the top electrode separated from the electro-optic polymer layer by the top cladding layer;
   means for heating the electro-optical component to greater than or equal to a first temperature;
   means for applying an electric field to the electro-optical component, the electric field created by a voltage differential between the top electrode and the bottom electrode;
   means for cooling the electro-optical component, wherein the electric field is maintained during the cooling; and
   means for removing the electric field when the electro-optical component reaches a temperature less than or equal to a second temperature, the second temperature less than the first temperature.

18. The device of claim 17, wherein the electro-optic polymer layer polarizes a light signal passing through the electro-optic polymer layer.

19. The device of claim 17, wherein:
the electro-optic polymer layer comprises chromophores and a host, each chromophore having a dipole moment;
in the presence of the electric field, the net dipole moment of each chromophore substantially aligns with the electric field; and
the net dipole moment of each chromophore is substantially parallel to the net dipole moment of other chromophores after removing the electric field.

20. The device of claim 17, wherein the electro-optical component is an integrated component of an optoelectronic device formed during the fabrication step and comprising a plurality of electro-optic elements.

* * * * *